US006760427B2

(12) United States Patent
Schultz et al.

(10) Patent No.: US 6,760,427 B2
(45) Date of Patent: Jul. 6, 2004

(54) COMPUTER TELEPHONY (CT) NETWORK SERVING MULTIPLE TELEPHONE SWITCHES

(75) Inventors: Laura S. Schultz, Gilbert, AZ (US); Mark J. Dancho, Chandler, AZ (US); David Mello, Chandler, AZ (US)

(73) Assignee: Inter-Tel, Inc., Tempe, AZ (US)

( * ) Notice: Subject to any disclaimer, the term of this patent is extended or adjusted under 35 U.S.C. 154(b) by 460 days.

(21) Appl. No.: 09/894,047

(22) Filed: Jun. 28, 2001

(65) Prior Publication Data

US 2003/0002647 A1 Jan. 2, 2003

(51) Int. Cl.[7] .............................................. H04M 7/00
(52) U.S. Cl. ................... 379/225; 379/219; 379/220.01
(58) Field of Search .......................... 379/88.13, 88.14, 379/88.17, 142.07, 207.12, 207.14, 211.02, 220.01, 221.06, 265.02, 265.09, 219, 225

(56) References Cited

U.S. PATENT DOCUMENTS

| | | | |
|---|---|---|---|
| 4,527,012 A | | 7/1985 | Caplan |
| 4,653,085 A | | 3/1987 | Chan |
| 5,339,356 A | * | 8/1994 | Ishii ........................... 379/234 |
| 5,414,762 A | | 5/1995 | Flisik |
| 5,479,487 A | | 12/1995 | Hammond |
| 5,499,289 A | | 3/1996 | Bruno |
| 5,546,452 A | | 8/1996 | Andrews |
| 5,848,143 A | | 12/1998 | Andrews |
| 5,987,102 A | | 11/1999 | Elliott |
| 6,011,844 A | | 1/2000 | Uppaluru |
| 6,021,428 A | | 2/2000 | Miloslavsky |
| 6,026,087 A | | 2/2000 | Mirashrafi |
| 6,091,808 A | | 7/2000 | Wood |
| 6,094,479 A | * | 7/2000 | Lindeberg et al. ..... 379/220.01 |
| 6,154,465 A | | 11/2000 | Pickett |
| 6,181,788 B1 | | 1/2001 | Miloslavsky |
| 6,295,350 B1 | * | 9/2001 | Schreyer et al. ........ 379/221.01 |
| 6,359,711 B1 | * | 3/2002 | Cole et al. .................... 398/58 |
| 6,359,892 B1 | * | 3/2002 | Szlam ........................ 370/401 |
| 6,381,324 B1 | * | 4/2002 | Shaffer et al. ......... 379/211.02 |
| 6,393,017 B1 | * | 5/2002 | Galvin et al. ................ 370/352 |
| 6,453,035 B1 | * | 9/2002 | Psarras et al. ......... 379/221.08 |
| 6,480,595 B1 | * | 11/2002 | Hamano ..................... 379/225 |
| 6,584,110 B1 | * | 6/2003 | Mizuta et al. .............. 370/401 |
| 6,636,587 B1 | * | 10/2003 | Nagai et al. ............. 379/88.14 |

* cited by examiner

*Primary Examiner*—Bing Bui
(74) *Attorney, Agent, or Firm*—Michelle Whittington

(57) ABSTRACT

An enhanced computer telephony (CT) network design for a private branch exchange (PBX) telephone system network improves the computer telephony interface (CTI) capabilities of the network. Bi-directional data from remote telephone switching nodes of different PBX systems, each using a common software application, is combined into a single data stream by the network to simplify control of the remote PBX systems. Commands to, and events received from, the different PBX switching nodes are combined by use of a gateway to automatically and transparently route digital information for control of the correct remote system node.

20 Claims, 5 Drawing Sheets

COMPUTER TELEPHONY (CT) NETWORK SERVING MULTIPLE TELEPHONE SWITCHES

BACKGROUND

Customer owned private branch exchange (PBX) systems are in widespread use. PBX systems adequately serve a large number of stations or telephone extensions in a single location. Frequently, however, customers have multiple locations, each having a PBX system or hybrid key system associated with it. These systems typically are controlled by computer-telephone integration (CTI) processors into various types of networks.

An early communications switching concept was disclosed in U.S. Pat. No. 4,527,012 to allow telephone call processing to be carried out by a host computer connected to a telephone system. The host computer viewed the telephone system as a peripheral device. The host computer then controlled the switching system with a series of high level commands exchanged between the switching system and the host computer. The commands were referenced to physical system ports to control the operation of those ports directly, based on the current call processing state. The connection of the host computer to the telephone system was accomplished by using a serial port (such as the RS-232 port). The system of this patent, however, and systems similar to it, are not inherently capable of connections or control using a computer network like TCP/IP because of the electrical network interface limitations of serial ports. In addition, computer programs of the type disclosed in the '012 patent must be aware of each equipped physical system port, and maintain a separate cross reference to correlate ports functionally to the assigned extension numbers, trunk numbers and so forth.

A different approach is disclosed in U.S. Pat. No. 4,653,085. In the system of this patent, computer telephony is implemented by attaching an adjunct processor to an associated telephone system port and sending control information for calls requiring additional call processing using a data exchange with the adjunct computer to simulate the actions of a connected station. The system of this patent requires all telephone calls, which are to be handled according to the stored program in the adjunct processor, to be transmitted by the telephone system to the port associated with that adjunct processor. The adjunct processor then sends direct commands back to the telephone system indicating the disposition of the call by directly sending a command to the port being served. Consequently, the adjunct computer simulates the behavior of a human operator. This system is limited by the volume of traffic which can be processed by a single operator (adjunct computer), and therefore it is not suitable for system-wide call handling tasks without terminating multiple ports to simulate the activities of multiple human operators.

U.S. Pat. No. 5,414,762 is directed to a system for providing computer control to a variety of PBX systems. In the system of this patent, a controller is used to allow one or more computers from a group of computer clients to send commands to a PBX by way of a server computer, and also to receive status information from the connected PBX. A converter which is specific to a particular PBX manufacturer is provided to allow the brand of PBX to be changed without having to modify the communications protocol, and therefore, the application software, that the computer client contains. The primary focus of this system is to allow the same client software to control a variety of PBX platforms. The system of the patent, however, provides no functional support for an application software developer to address the needs of multiple PBX systems, or for expanded networks of PBX systems in multiple locations. In either of these cases, the application software must be enhanced to allow it to be aware of, and to properly control, multiple PBX nodes. Because the application software resides at the client level, it can only control one call per work station and cannot address the needs of the entire system. An approach to resolve problems associated with routing calls to geographically distributed PBX nodes is disclosed in U.S. Pat. Nos. 5,546,452 and 5,848,143. The systems of these patents use a central controller with global authority to allow resident software to route calls appropriately to agents who are connected at various locations within the PBX network. The systems disclosed in these patents require the central processor to be equipped with routing and management software specifically designed for the expected call processing activity. These systems do not facilitate the transposition of a generic computer telephony application from a single PBX to networked PBX environment, and must take full control of the PBX network by correlating the identities of logged-in agents with a physical node and port locations in the PBX. As a consequence, the approach used in the systems of these patents requires a facility which must undergo continuous parallel maintenance to keep up with PBX user changes.

U.S. Pat. No. 5,479,487 discloses a system for allowing a centrally located scripting language to control a call as it passes between functional partitions within a call center system. The system creates a scripted development environment for distributed call processing products; but it does not address cases where there is a distributed network of PBX systems which require computer telephony control from some centralized application.

U.S. Pat. No. 6,011,844 is directed to a system for saving long distance toll charges. The system uses interconnected computer gateways to coordinate the switching of calls between network call centers. Each of these call centers receives telephone traffic according to methods designed to provide the lowest cost handling of each call, and only "bridges in" calls over the long distance network when necessary. The system of this patent is narrowly focused on reducing call traffic over the long distance network which may be handled in a local call center. The system is not capable of centralized consolidation of events arriving from different connected PBX nodes.

With the advent of intelligent networks within the public telephone system, U.S. Pat. No. 6,094,479 is directed to a solution which allows for the public network service control element to link with a PBX located within a customer's private network by using a gateway between the private and public network segments. The gateway, however, is limited in its functionality because it simply provides a standard means to link between two networks, and does not address the problems created when a customer makes the transition from single to multiple PBX nodes within a private network.

U.S. Pat. No. 6,181,788 is directed to a system for achieving uniform control of mixed platforms in telephony. Not all PBX manufacturers use the same protocols to implement computer-telephone integration (CTI) interfaces to a control computer. This patent is directed to a solution to solve software interface problems for customers who have a network of mixed types of PBX systems. The solution proposed in the '788 patent is to use the CTI processors to convert the protocols from each PBX and then network together the CTI processors by way of a peer-to-peer network. Each CTI processor contains its own software with some form of messaging used to loosely link the various systems at each site. This patent is directed to the problem of mixed or different PBX system types. The patent does not address the problem of system scaling (that is, adding additional PBX's to a customer's system), and control of networked systems using a common software application.

It is desirable to enhance the CTI functionality of a PBX network having multiple nodes by combining bi-directional data from remote telephone switching nodes (different PBX systems) into one data stream to simplify the control of the remote system.

SUMMARY OF THE INVENTION

It is an object of this invention to provide an improved system and method for serving multiple telephone switches.

It is another object of this invention to provide an improved method and system for a private branch exchange (PBX) telephone system network.

It is an additional object of this invention to provide an improved interface network linking a plurality of PBX systems over a wide area network.

It is a further object of this invention to provide an improved system and method employing computer telephony interface (CT) for a private branch exchange (PBX) telephone system network using a common software application for linking each of the PBX exchanges together in a transparent manner to users at any of the exchanges.

In accordance with a preferred embodiment of the invention, a computer telephony interface CT) for a private branch exchange (PBX) telephone system network utilizes a gateway processing system located on an adjacent computer. Each of the PBX systems has a unique address; and they are linked together through a wide area network (WAN), local area network (LAN), or the Internet to the Gateway processing system. The processing system includes translation tables for the addresses, as well as individual station extensions; so that calls originating from any one of the PBX systems on the network and directed to a station on any of the other PBX systems on the network pass their event (call progress) notification through the gateway where it is translated and directly sent to all users (applications) that requested the information in a manner which is transparent to the users of the system. Thus, the users are not aware that more than one PBX system is involved in the call event. The system also allows for changing the data in the translation table to allow relocation of a device associated with a particular extension number to any one of the PBX systems in the network without requiring individual programming at that, or any other, network.

DETAILED DESCRIPTION

Figure 1:
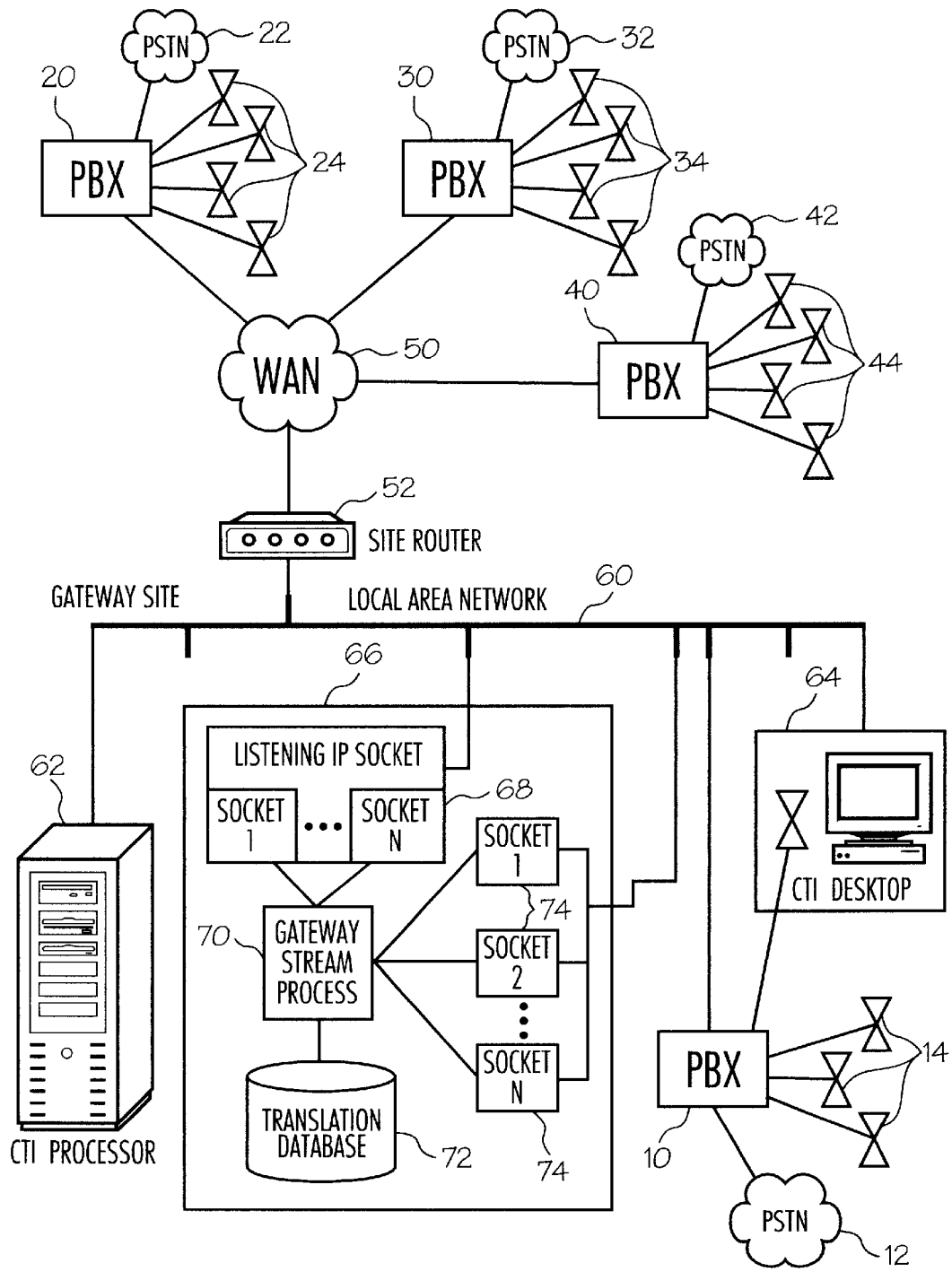
FIG. 1 is a schematic diagram of a preferred embodiment of the invention.

Reference now should be made to the drawings, which illustrate a preferred embodiment of the invention. FIG. 1 is a block diagram illustrating the inclusion of a CT gateway processor as part of the system. As shown in FIG. 1, four separate PBX systems 10, 20, 30 and 40, all using a common software application, are employed as part of a PBX network for a single user, such as a business with offices in four different locations. Each of the PBX systems is connected with the public switched telephone network (PSTN), shown as 12 for the PBX 10, and includes a plurality of telephone devices or locations, shown as 14 for the PBX 10, each of which are reached by a particular extension number. For the PBX systems 20, 30 and 40, the PSTN links are shown as 22, 32 and 42, respectively; and the telephones associated with the individual PBX's 20, 30 and 40 are indicated as 24, 34 and 44, respectively.

In the system shown in FIG. 1, all of the different PBX locations are linked through a wide area network (WAN) 50, through a site router 52, for communication with one another. For the PBX 10, the local interconnections to a local area network (LAN) 60 are indicated; and the LAN 60 is shown as utilizing a computer-telephony integration (CTI) applications processor 62 associated with it for executing applications for communicating between the different PBX systems on the network over the WAN 50.

Also illustrated in FIG. 1 is a CTI application desktop and telephone 64 connected to the LAN 60, which can be linked to and through the PBX 10 in a conventional manner. Other system devices with which the computer telephony interface (CT) gateway processor 66 communicates also may be included; and stub-outs showing potential connections to such other devices on the LAN bus 60 are indicated in FIG. 1. It should be noted that communications through the CT gateway 66 to different PBX nodes, such as the remote nodes 20, 30 and 40 are effected by using a standard site router device 52 to send and receive TCP/IP packets in data transfers in a conventional manner.

The operating software of the system control arrangement which is effected by the CT Gateway 66 constantly accesses and updates information from a common translation database as data arrives by way of the WAN 50 or LAN 60 on behalf of each of the switching system nodes 10, 20, 30, 40. Each switch node has a respective socket 74 which it uses for communications to the CT Gateway 66. The Gateway stream process 70 continuously polls these sockets 74 in the event that the switching node has sent data to it. All of this is placed into a resulting consolidated event data stream made available to one or more CT software applications automatically. This is illustrated generally in the diagram of FIG. 1 by the interconnections from the listening or incoming IP sockets 68 to the Gateway stream process 70.

Although the system described immediately above refers to specific "sockets", rather than relying on actual physical connections employed by previous product designs, the CT Gateway 66 only requires that a standard TCP/IP network connection be available between the connected devices. This allows a network installer to quickly verify that all required devices are properly interconnected into the network logic without having to interconnect complicated panels of physical RS-232 ports. The end result is an interconnection topology based on standard TCP/IP networks recognized by the computer industry. The application-level information present within the TCP/IP packets acts as a transport for the majority of the communication network infrastructure of the preferred embodiment of the invention illustrated in FIG. 1.

In order to transparently program and/or control each of the various telephony devices, such as 14, 24, 34, 44 or "extensions" used with any one of the PBX systems 10, 20, 30 or 40, an extension number and node translation data base memory 72 is provided for mapping all of the extensions in all of the PBX systems 10, 20, 30 and 40 into a single random access memory 72. Once this is done, the specific extension number as well as the IP address for the PBX 20, 30, 40 or 10 with which it is associated, is stored in the memory 72. A link from a calling party at any of the PBX system nodes is made by the Gateway stream process 70 through corresponding output node "sockets" 74, equal in number to the number of PBX systems 10, 20, 30, 40 (or whatever number) used in the completed network. Once again, while specific reference is made to "sockets" on the output side of the process 70, it should be noted that standard TCP/IP network connections are utilized to effect the transfer of data from the CT Gateway 66 back onto the LAN 60, and then on through the site router 52 and the WAN 50, if necessary, to the desired location.

Figure 2:
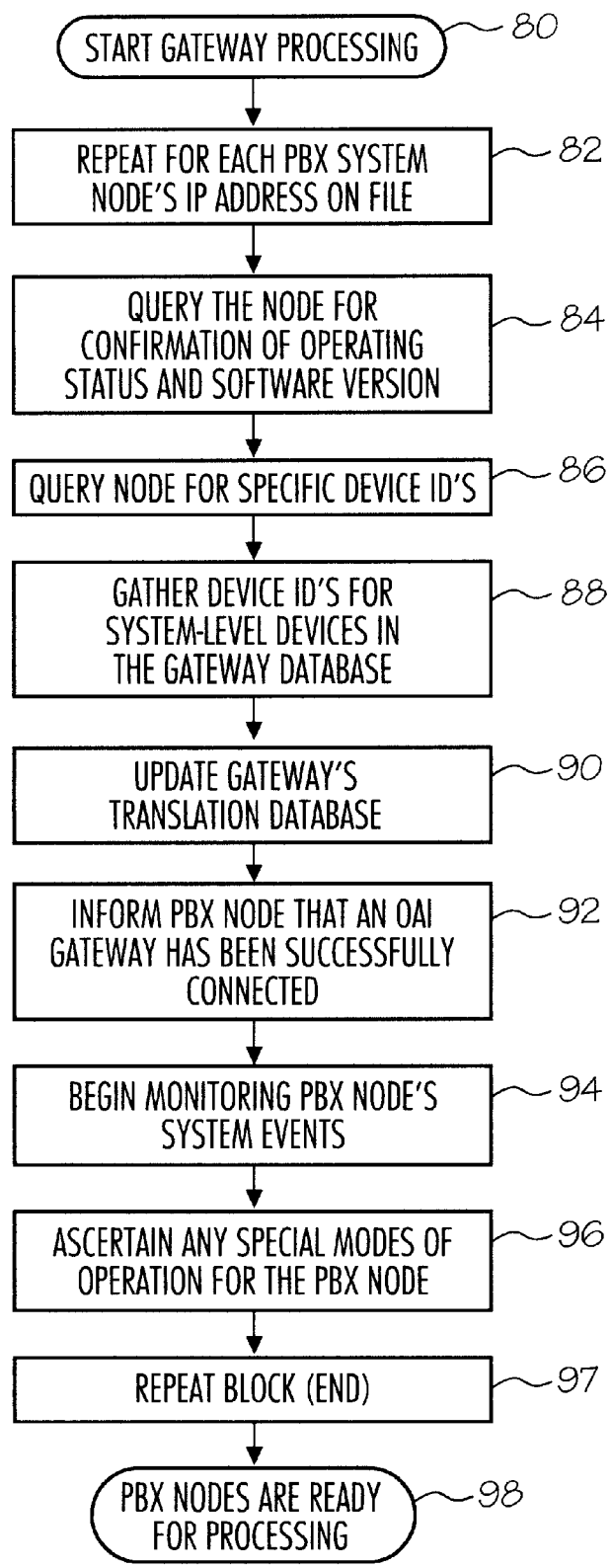
FIG. 2 is a flow chart useful in explaining the initialization of the system.

In order for the Gateway to provide data to applications, the CT Gateway 66 must be integrated into the user's network to provide services to this network. The CT Gateway must then be started, either manually or automatically, as determined by the user. The processing which occurs during startup is illustrated in FIG. 2. Prior to this initialization, the user is required to configure valid IP address and ports for each of the PBX systems to be used, as well as configuring the master or listening socket 68 for the gateway. This master socket is used by the Gateway to listen for clients requesting connections to the server. Upon commencing initialization, the gateway connects to each switch node using the respective socket 74. The processing begins as shown on FIG. 2 "Start Gateway Processing" 80. It should be noted that the following initialization may be repeated for each PBX system node's IP address. As such "repeat" blocks 82 and 97 are included to illustrate that initialization may be effectuated for each PBX system. The gateway first obtains the operating status and software version of the switching node at 84. It will then query the individual device identifiers for the node at 86 placing each device entity obtained into the Gateway database 88 and 90. The gateway will inform the PBX system node of the gateway presence at 92 and begin monitoring the node for any system event data at 94. The gateway may then also ascertain if any of the PBX systems include a special mode of operation, e.g. diagnostic. login, monitoring, performance. etc. at 96. It will also configure the PBX system node so that the data it sends is in the format required by the gateway. The PBX nodes are now ready for processing at 98.

Once all of the PBX systems have completed this initialization, the Gateway will begin to listen for applications request for service through the master socket 68. The client application on the CTI application desktop 64 will attempt to establish communication with the Gateway by sending a logon message to the gateway by way of the master socket 68. Once the Gateway has recognized this application, it will send a "power up" response indicating it is ready to begin servicing the client's application on the CTI application 64. The logon message sent by the client must take the form of:

<ByteCount><Type of Socket><Password>0x00[<AppName>0x 00]

where:

ByteCount—(the byte count for the data being passed)

Type of socket—passed as hex 87 (0x87)

Password—up to 15 ASCII characters

Appname—up to 32 ASCII characters. This is optional, but it is useful in knowing which socket connection is connected to which application when running multiple applications.

Upon receiving the Power Up response from the CT Gateway 66, the application on the desktop 64 is free to send any commands to allow it to perform its task. In most cases this will require the application to begin monitoring a device or set of devices. This results in monitor start request arriving at the CT Gateway 66 from the application desktop 64. These commands are processed and are routed to the proper PBX node socket 74 by determining which device is affected in the command and mapping it to the corresponding PBX node using the gateway database 72. In the event that the gateway determines that a monitor already exists for a particular device, it will not need to forward the command to a PBX node, but simply creates a suitable response for the application on desktop 64 immediately. In the event the device is not yet monitored, a command is sent to a PBX node which will shortly thereafter send a command response back to the socket 74. The Gateway receives this command response and determines which application the response is destined for and routes it to the application on the desktop 64 only.

In the event the monitored device generates an event, the event is routed to the socket 74, which is polled shortly thereafter by the Gateway stream process 70. At this point the Gateway 66 determines the device and type of event and then determines if any application will require this event. The event then is forwarded to any interested applications, such as those on the desktop 64.

The system also routinely polls the application sockets 68 looking for commands to send to the phone system. The commands are processed and the affected extension information is used along with the database 72 to determine to which switch socket(s) 74 connection the command is to be routed. After the command(s) is sent and acknowledged by the switch node which posts a response at socket 74, the Gateway then subsequently routes the response to the associated application which originated the command.

In the course of normal processing, as data arrives at a socket 74 for each PBX node, the system uses the sequence number of the message to determine if there has been any data lost between messages. In the event that there has been lost data, the Gateway 66 generates an error event to each application which uses the specified node and once again performs initialization processing on that node. Once the node completes re-initialization the application processing can recommence. While the node is not responding, the application is unable to route commands to the switching system (unless they are node aware, as described subsequently).

In special cases, an application can command the Gateway 66 to let it be more intelligent about the topography of the switching environment. It allows the application to know what nodes are present, as well as to be less affected by the failure of any one node. This mode of operation is referred to as node awareness and allows a single node failure not to adversely affect the behavior of the external application. In the event of loss of communication at any single node, the Gateway 66 sends the application a link status failure and attempts to recommence communication with the failing phone system node. The application is still able to send commands to all of the other operating nodes. This is in stark contrast to a non-node aware application, which cannot communicate with any node until communication is restored to the failing node.

In the course of normal processing, extensions can be added or deleted from a switching node. These changes result in extension change events sent to the socket 74 for the associated PBX node. Upon polling the socket, the gateway 66 adjusts the database 72 with respect to the extension change event.

Figure 3:
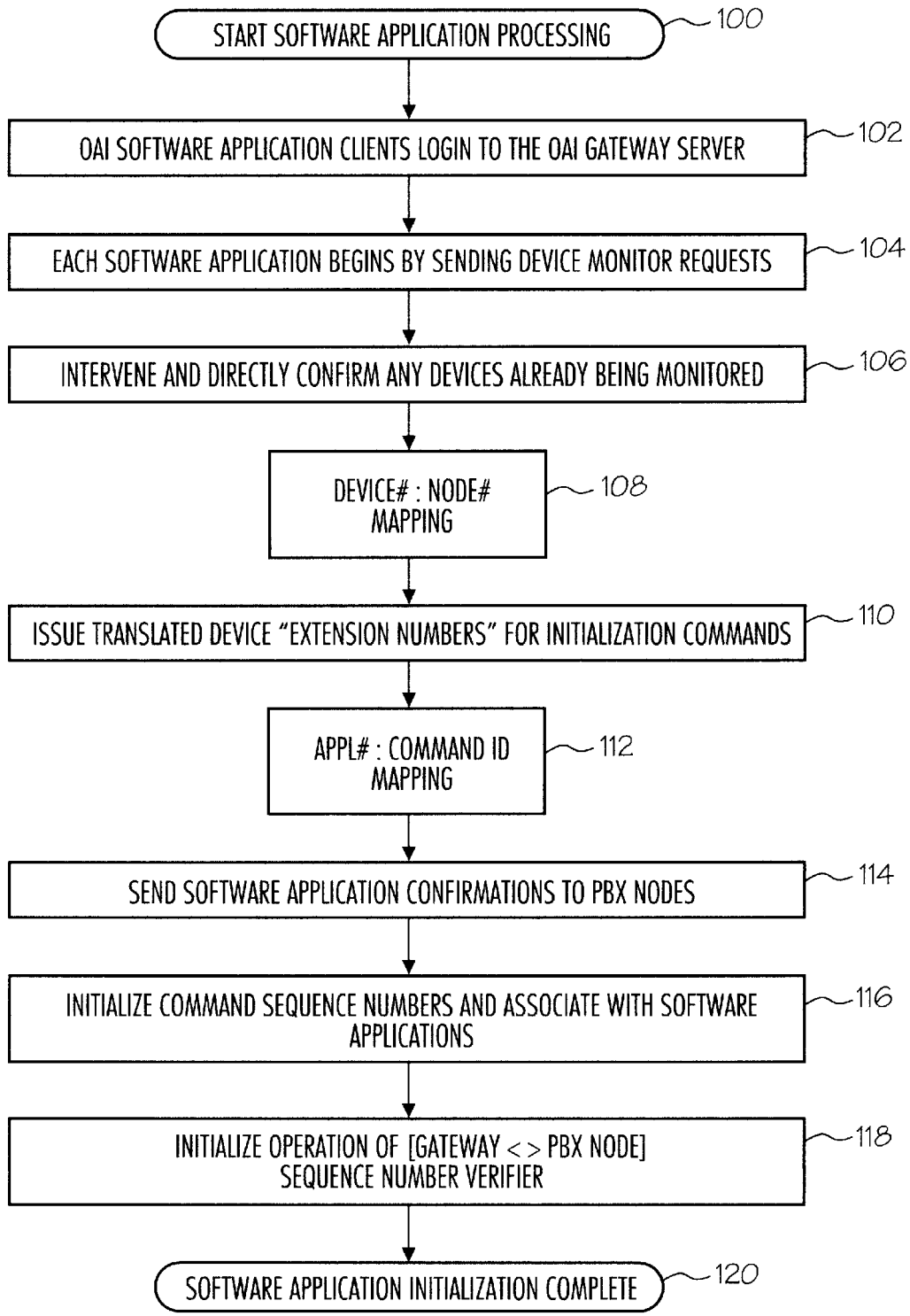
FIG. 3 is a flow chart illustrating software application processing.

FIG. 3 is an example of one manner of programming which illustrates an operation of the system to complete initialization at 100. The system may include a login procedure to the gateway server at 102. The system, at 104, allows each software application to internally initiate and begin sending device monitor sequences to open communications links with associated devices. If some devices already are begin monitored, confirmation is made at 106; and then the device numbers (telephone extensions) and the node numbers mapping is done at 108. After the device and nodes mapping, the system issues translated device "extension numbers" for initialization commands at 110; and these are provided with application numbers and command ID mapping at 112. Software applications then are confirmed to the PBX nodes at 114; and command sequence numbers are initialized and associated with the software applications at 116. The operation of the sequence number verifier, that is the Gateway and the PBX node, are accomplished at 118; and the software application initialization is completed at 120. The system is now prepared to operate as a communications link which is transparent to the users at each of the different PBX nodes 10, 20, 30 and 40.

Figure 4:
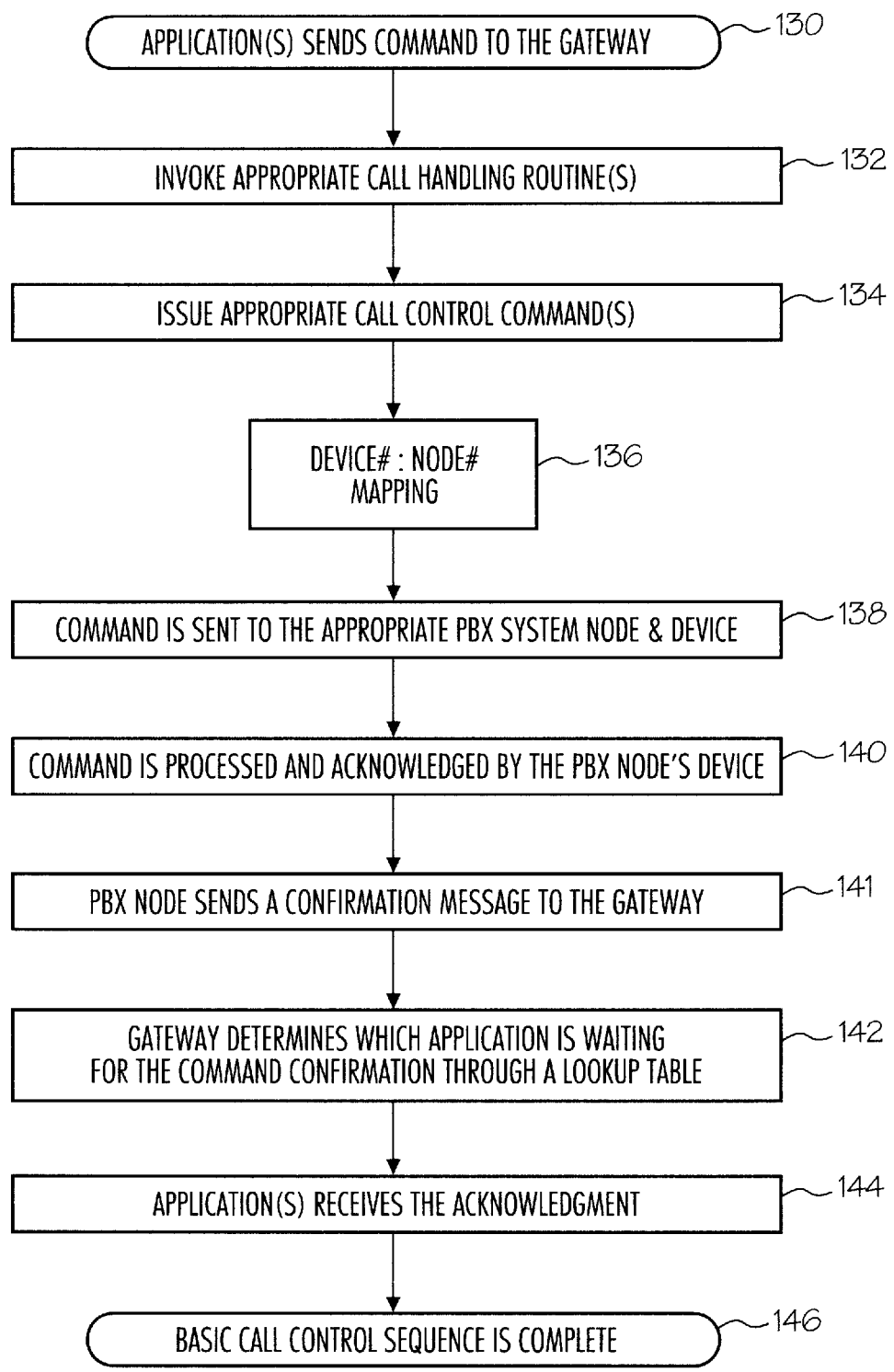
FIG. 4 is a flow chart illustrating an operation of the system shown in FIG. 1.

As processing continues in an example of a typical gateway process, as shown in FIG. 4, the Gateway monitors the polled data arriving from each CTI application. If the Gateway receives a command from an application (system event) at 130, the Gateway 66 invokes acceptable call handling routines at 132, and issues appropriate call control commands at 134 in accordance with the standard PBX operating procedures. These commands are supplied to the device number and node number mapping for translation at 136, and from there, the command is sent to the appropriate PBX system node and device, as shown at 138. This means that the system node IP socket 74 (FIG. 1) which is specific to the device (extension number) is selected; and the information is transmitted back out through the LAN and through the site router 52 through the WAN 50 to the appropriate selected one of the PBXs 10, 20, 30 or 40 which has that particular extension 14, 24, 34 or 44 associated with it. In the example shown in FIG. 4, the command is processed and acknowledged by the PBX node at 140 in a conventional manner, and a confirmation at 141 is sent back through the Gateway 66 which determines through a lookup table at 142 which CTI application is waiting for this command confirmation message. The Gateway 66 sends the command confirmation message at 142 to the appropriate CTI application at 144. At 146, the basic call control sequence is complete; and a call is effected between the calling and called parties without either of the parties knowing whether they are operating within a single one of the PBX systems 10, 20, 30 or 40, or whether the call has been handled from one system, through the Gateway, to another. As far as the individual parties are concerned, the call appears to be handled entirely within the same PBX.

Figure 5:
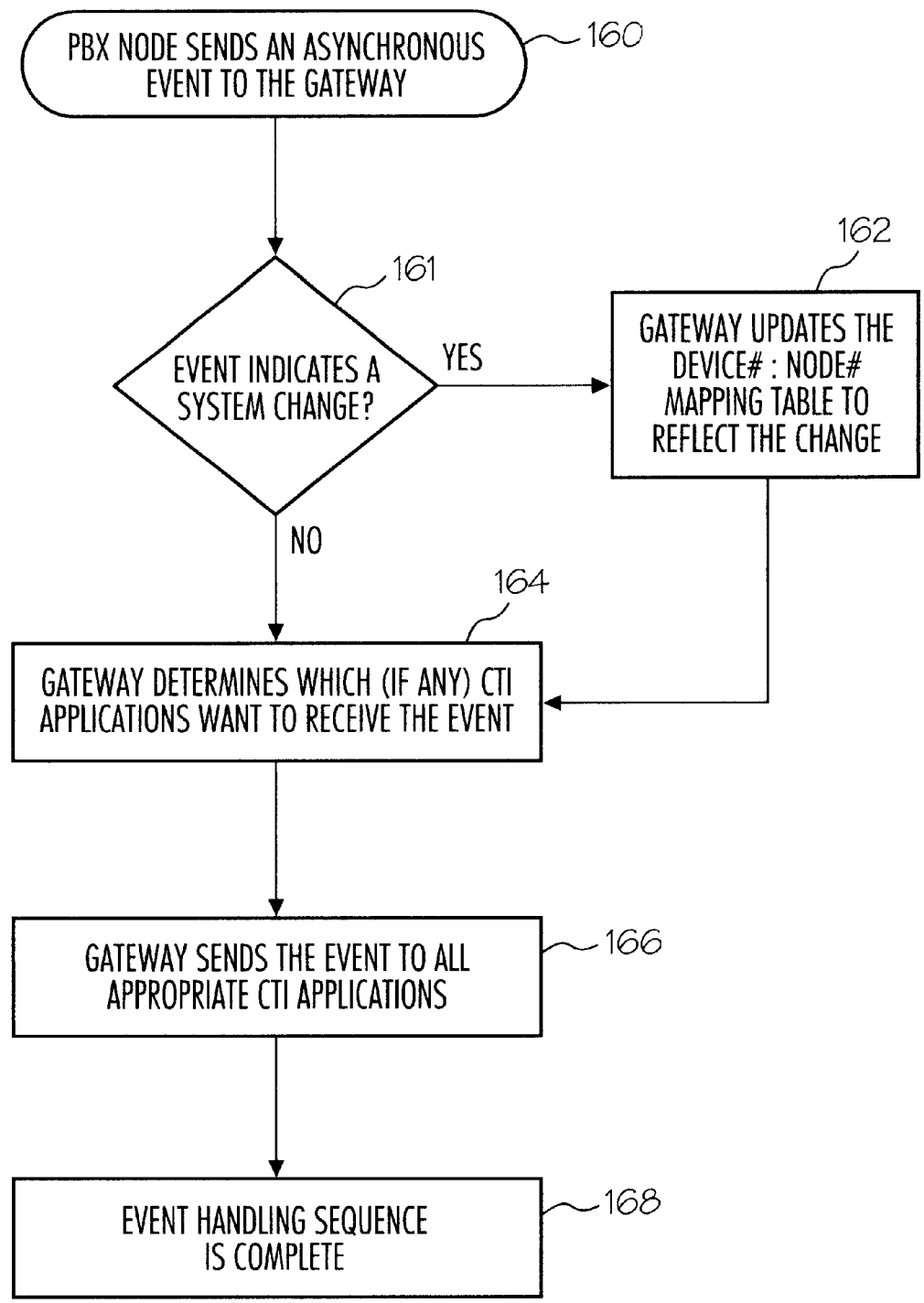
FIG. 5 is a flow chart illustrating an operation of the system shown in FIG. 1.

As processing continues in conjunction with the sequence described in FIG. 4, the CT Gateway also monitors the polled data arriving from each of the PBX nodes at 160 (FIG. 5). If the event received indicates a system change at 161, the Gateway 66 reads the nature of the update at 160 and makes changes to the mapping provided by the specific device number (extension number) and PBX node device translation database at 162, and supplies this information to the device number and node number mapping memory. These changes are made automatically.

The changes also occur on an ongoing basis; and once a change has been committed to the database at 162, the translation of packets from that point on is done according to the revised translation mapping information stored in the database (72 of FIG. 1). These changes occur continuously and transparently to the software applications that are utilizing the gateway in the manner described above in conjunction with FIG. 4. The overall process is designed for the applications software to be able to complete the processing of the appropriate call event and continue to provide real time control of the selected devices connected to each PBX node. If the event does not reflect a system change, or once the system change update has been completed by the Gateway, the Gateway then determines which, if any, CTI applications want to receive the event at 164. The Gateway determines this by looking at which monitor sessions each CTI application has initiated. The Gateway sends the event to all appropriate CTI applications through the LAN at 166. The event handling sequence is complete at 168.

The system can be programmed differently to employ the Gateway 66 in operations other than the ones shown by way of example in FIGS. 3, 4 and 5. Other versions of the system may incorporate telephone switches that purely exist within the computer servers. The network topologies for such systems are capable of combining the functions of the CT Gateway process into one (presumably a "main" system) PBX node to eliminate the need for a separate server to house the CT Gateway process. Then, any CT application will be able to login to the main phone system server to obtain a consolidated data stream from the entire network of PBX nodes. Such a version further simplifies the network topology and makes processing more efficient.

The foregoing description of the preferred embodiment of the invention is to be considered as illustrative and not as limiting. Various changes and modifications will occur to those skilled in the art for performing substantially the same function, in substantially the same way, to achieve substantially the same result, without departing from the true scope of the invention as defined in the appended claims.

What is claimed is:

1. A computer telephony (CT) network for a private branch exchange (PBX) telephone system network including in combination:

a plurality of private branch exchange (PBX) systems using a common software application and linked together through a network, each of the PBX systems having a unique address;

a gateway processing system located on the network with one of the plurality of PBX systems, the gateway processing system having a plurality of application sockets with each application socket corresponding a CT application;

a memory in the gateway processing system for storing a translation table identifying extension numbers on each of the PBX systems and combining these extension numbers with the unique addresses for each PBX system to provide mapping information for sending a command from any of the application sockets to a node socket for the PBX system, the node socket representing a physical location for an affected party extension number.

2. The CT network according to claim 1 wherein the gateway processing system receives a system event from one of the plurality of PBX systems through the corresponding node socket for that one of the PBX systems, with the system event processed by the CT network applied to the translation table in the memory.

3. The CT network according to claim 1 further including means coupled with the gateway processing system to change the mapping of an extension number and address in the memory whenever changes in the physical location of an extension number occurs.

4. The CT network according to claim 3 wherein the changes supplied to the memory are received from any one of the plurality of PBX systems where the change is to be effected.

5. The CT network according to claim 1 wherein the gateway processing system receives a system command from one of the CT applications through the corresponding socket for that application, with the system command applied to the translation table in the memory, whereupon the command is processed and provided to the socket for a PBX system having an extension number for a device corresponding to the requested command, whereupon the translation by the gateway processing system is transparent to the application sending the system command.

6. A method for expanding PBX systems from a single PBX system to multiple interconnected PBX systems including the steps of:

providing a gateway at a PBX system for translating bi-directional commands over a packet network to a community of PBX nodes, each utilizing a common software application; and providing a translation table in the gateway to allow PBX network changes and rearrangements by translating addresses for the PBX systems and individual extension numbers for individual devices to transparently route a system event through the gateway from and to the different PBX nodes.

7. The method according to claim 6 further including the step of receiving changes from the PBX nodes for updating the information in the translation table of devices on a continuous basis.

8. The method according to claim 6 further including polling a plurality of node sockets, each of which correspond to one of the PBX nodes in the community, to retrieve data from the PBX nodes.

9. The method according to claim 8 further including, in response to receiving a command from the gateway at the PBX node, sending a notification to the corresponding node socket at the gateway, and routing the notification to an application originating the command.

10. A telecommunications system comprising:

a remote site communicating with a gateway site over a packet network;

the remote site having,
a plurality of individual PBX nodes identifiable by a unique IP address for the node, each PBX node including a plurality of associated endpoints and each endpoint identified by an extension number, and each PBX node communicating with a PSTN; and the gateway site having,
a CT gateway processor having a software application executing thereon for unifying a plurality of bi-directional data to and from the remote site and the gateway site,
a plurality of node communication ports wherein each of the ports interacts with one of the PBX nodes,
a gateway stream system that periodically polls the node communication ports to retrieve data received from the PBX nodes,
a memory having retrievable storage comprising the plurality of extension numbers for the endpoints and the plurality of IP addresses for the PBX nodes, the gateway stream system receiving an event from one of the PBX nodes at its corresponding node communication port and, in combination with the memory, addressing the event and sending the event to an intended application socket and sending control commands from the processor to the PBX nodes.

11. The telecommunications system of claim 10 wherein the event comprises a change in of one of the extension numbers from a first PBX node to a second PBX node and the addressing comprises updating the memory accordingly.

12. The telecommunications system of claim 10 wherein upon receipt of a control command from the processor, the PBX node posts a response at its corresponding node communication port and the gateway stream system forwards the response to an application originating the command.

13. The telecommunications system of claim 10 wherein the gateway stream system is configured to determine if any the data retrieved from the port has been lost and if so, to generate an error to all interested applications which use corresponding PBX node.

14. The telecommunications system of claim 10 wherein the system is configured as node-aware such that if communication fails between one of the PBX nodes and the gateway site, then the gateway site is able to communicate with the remaining PBX nodes.

15. The telecommunications system of claim 10 wherein the system is configured as non-node-aware such that if communication fails between one of the PBX nodes and the gateway site, then the gateway site is unable to communicate with the remaining PBX nodes until communication is restored to the failing PBX node.

16. The telecommunications system of claim 10 wherein the event comprises either an addition or a deletion of extension numbers from one of the PBX nodes and the addressing comprises an update of the memory accordingly.

17. The telecommunications system of claim 10 wherein the packet network comprises one of a WAN, a LAN, or the Internet.

18. A method for linking multiple CTI applications to control a network of multiple interconnected PBX systems such that the PBX systems appear to the CTI applications as a single PBX system, the method comprising:

coupling the CTI applications and the PBX systems to a gateway function over a packet network;

processing, at the gateway, bi-directional data routed between the CTI applications and the PBX systems;

using a translation table in the gateway to selectively route commands from one of the CTI applications to the applicable PBX system;

using a translation table in the gateway to selectively route events from one of the PBX systems to the applicable CTI application; and operating a service within the gateway to make modifications to the translation table in response to a change comprising a PBX network or a device change, such that the change appears transparent to the CTI applications.

19. The method according to claim 18 further including, receiving the change from one of the PBX systems for updating the translation table on a continuous basis.

20. The method according to claim 18 further including, in response to receiving a specific command at the gateway from one of the PBX systems, sending notification of the change to the selected CTI application.

* * * * *